US011327856B2

(12) United States Patent
Fukuta et al.

(10) Patent No.: US 11,327,856 B2
(45) Date of Patent: May 10, 2022

(54) ROBOT APPLICATION MANAGEMENT DEVICE, SYSTEM, METHOD AND PROGRAM

(71) Applicant: INTEC INC., Toyama (JP)

(72) Inventors: Tatsuya Fukuta, Tokyo (JP); Ruri Hamada, Tokyo (JP); Koji Hayashi, Tokyo (JP)

(73) Assignee: INTEC INC., Toyama (JP)

( * ) Notice: Subject to any disclaimer, the term of this patent is extended or adjusted under 35 U.S.C. 154(b) by 110 days.

(21) Appl. No.: 16/964,286

(22) PCT Filed: Jan. 25, 2019

(86) PCT No.: PCT/JP2019/002517
§ 371 (c)(1),
(2) Date: Jul. 23, 2020

(87) PCT Pub. No.: WO2019/146763
PCT Pub. Date: Aug. 1, 2019

(65) Prior Publication Data
US 2021/0034479 A1 Feb. 4, 2021

(30) Foreign Application Priority Data

Jan. 26, 2018 (JP) .............................. JP2018-011123

(51) Int. Cl.
*G06F 11/20* (2006.01)
*B25J 9/16* (2006.01)
(Continued)

(52) U.S. Cl.
CPC ............. *G06F 11/202* (2013.01); *B25J 9/162* (2013.01); *G06F 9/45558* (2013.01);
(Continued)

(58) Field of Classification Search
CPC ......... G06F 9/45558; G06F 2009/4557; G06F 2009/45591; G06F 11/202; G06F 9/4862; H04L 67/34; B25J 9/162
See application file for complete search history.

(56) References Cited

U.S. PATENT DOCUMENTS

2010/0115621 A1* 5/2010 Staniford .............. G06F 21/561
726/25
2013/0042115 A1* 2/2013 Sweet ..................... H04L 63/20
713/176
(Continued)

FOREIGN PATENT DOCUMENTS

JP 2009-282652 A 12/2009

OTHER PUBLICATIONS

Fei Q, "ROS Programming", Robot Operating System, Morikita Publishing, Mar. 30, 2016, pp. 1-35.
(Continued)

*Primary Examiner* — Tuan C Dao
(74) *Attorney, Agent, or Firm* — Foley & Lardner LLP

(57) ABSTRACT

A robot application is executed by executing a plurality of kinds of virtual containers in cooperation with each other. To this end, a robot application management device (100), at least one robot device (300) and at least one computer device (400) are connected to each other via a local area network (600). A group of devices including these devices are managed as a cluster for executing the robot application, and each virtual container is placed and activated in any of the group of devices composing the cluster.

19 Claims, 11 Drawing Sheets

(51) Int. Cl.
*G06F 9/455* (2018.01)
*G06F 9/48* (2006.01)
*H04L 67/00* (2022.01)

(52) U.S. Cl.
CPC ............ *G06F 9/4862* (2013.01); *H04L 67/34* (2013.01); *G06F 2009/4557* (2013.01); *G06F 2009/45591* (2013.01)

(56) References Cited

U.S. PATENT DOCUMENTS

| | | | |
|---|---|---|---|
| 2015/0046425 A1* | 2/2015 | Lin ....................... | G06F 9/4843 707/708 |
| 2018/0026944 A1* | 1/2018 | Phillips ............... | H04L 63/1433 726/4 |
| 2019/0325763 A1* | 10/2019 | Hux .................... | A63F 13/5255 |
| 2020/0076879 A1* | 3/2020 | Lin ......................... | H04L 67/10 |
| 2020/0302311 A1* | 9/2020 | Scheutz ................. | G06F 30/20 |

OTHER PUBLICATIONS

Koga M, Docker Practical Guide, Impress Corporation, Dec. 21, 2015, pp. 1-495.

Fukuta T et al, "Development of service robot using network / virtualization environment provided by edge computing device", IEICE Technical Report, Aug. 25, 2017, vol. 117, No. 198, pp. 37-42.

Kagami T et al, "A Recommendation Cloud System for Robot Application considering Robot Hardware Configuration", IEICE Technical Report, Feb. 20, 2012, vol. 111, No. 446, pp. 19-23.

Terauchi A et al, "R&D activities toward new value creation through IoT", NTT Technology Journal, Jul. 1, 2017, vol. 29, No. 7, pp. 19-23.

International Search Report issued in corresponding application No. PCT/JP2019/002517 dated Apr. 2, 2019 with English translation.

Office Action issued in corresponding Japanese Application No. 2018-011123 dated Apr. 2, 2019 with English translation.

* cited by examiner

FIG. 9
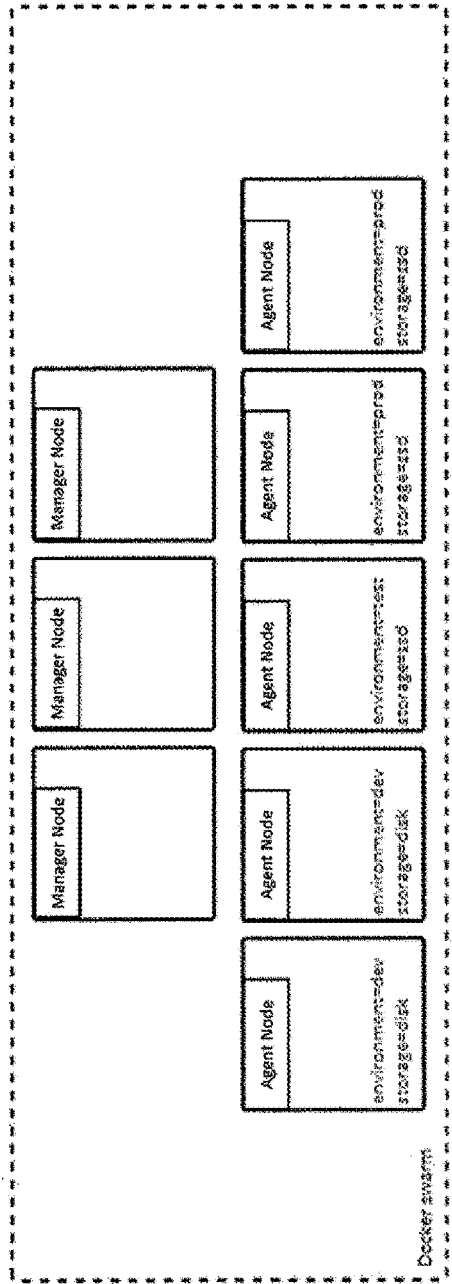
(a) LABEL FUNCTION OF Docker Swarm
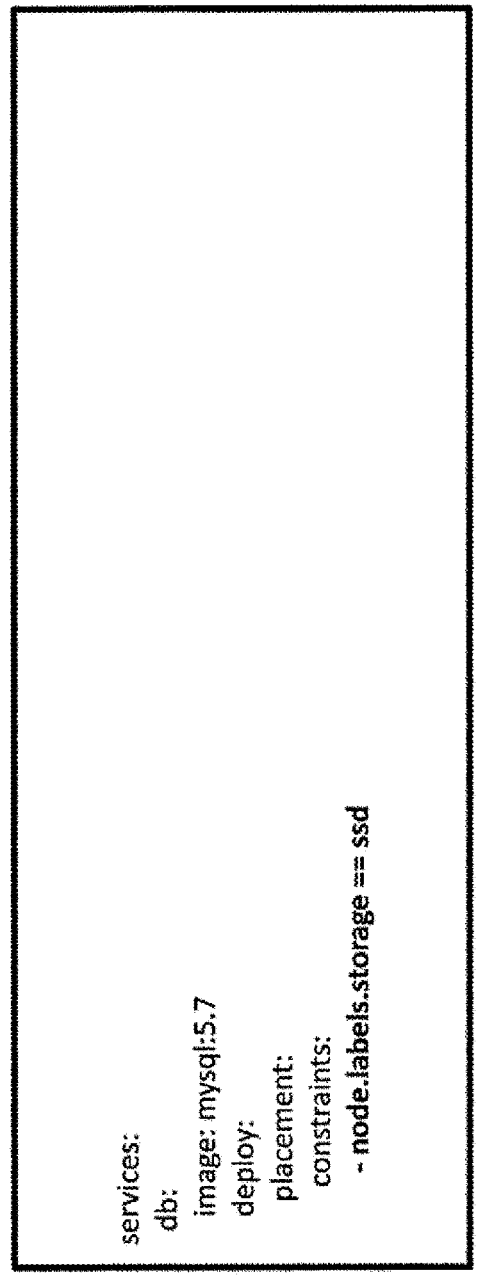
(b) yml Description (REFERRED TO IN S71 IN Figure 7)

1

ROBOT APPLICATION MANAGEMENT DEVICE, SYSTEM, METHOD AND PROGRAM

TECHNICAL FIELD

The present invention relates to a technique of realizing a robot system with a distributed computation system. In particular, it relates to a mechanism that manages a robot application in the system.

BACKGROUND ART

In recent development of software for service robots, middleware for robots oriented to distributed computation systems called Robot Operating System (ROS) is increasingly used. The ecosystem and the rich set of libraries provided by the ROS are improving the efficiency of development of service robots (see Non-Patent Literature 1, for example).

The distributed computation system is an old concept in the field of computer science. A typical mechanism is to bundle a plurality of computers composing a system to form a cluster of computers. Such a mechanism includes a mechanism for automating many operations/monitoring to improve the efficiency of development and reduce the cost of quality control. Such a mechanism is implemented by a combination of various technologies based on various network technologies and virtualization technologies (see Non-Patent Literature 2, for example).

CITATION LIST

Non-Patent Literature

[Non-Patent Literature 1] "ROS Programing", Sen Hi, Morikita Publishing, Co., Ltd. (Mar. 30, 2016)
[Non-Patent Literature 2] "Docker Practical Guide", Masazumi Koga, Impress Corporation (Dec. 21, 2015)

SUMMARY OF INVENTION

Technical Problem

Although it has become a common practice to realize a robot system with a distributed computation system by composing the robot system from a plurality of computers, management or control of a plurality of computers is not defined in the ROS. Therefore, the ROS may randomly use a large amount of machine or process resource or may be restricted in application depending on the network environment (time synchronization, address assignment, name resolution or the like).

At present, to avoid this, a developer or administrator of a robot system needs to manually login to each computer composing the robot system and individually execute or maintain a process for the robot. In addition, different developers or administrators handle an application having a physical restriction on its execution, such as a robot system, in the distributed computation system in different ways. Therefore, it is difficult to continuously develop the distributed computation system, and many developments have come to a deadlock after the stage of prototyping and demonstration experiment.

Techniques for continuously optimizing the development, operation/monitoring and quality control of the distributed computation system have been developed in the field of computer science, and one of such techniques is the virtualization technique. However, many of the conventional virtualization techniques are hypervisor-based and are not used for robot systems. This is because robot hardware may be unable to be recognized in the hypervisor-based environment.

An object of the present invention is to apply a technique for continuously optimizing the development, operation/monitoring and quality control of a distributed computation system in the field of computer science to a robot system and reduce the complexity of management and control of a computation resource and a network environment by a developer or administrator of the robot system.

Solution to Problem

An aspect of the principle of the present invention is a robot application management device that executes a robot application by executing a plurality of kinds of virtual containers in cooperation with each other, including: means for managing a group of devices (robotic devices) including at least one robot device and at least one computer device that are connected to the robot application management device via a local area network as a cluster for executing the robot application; and means for placing and activating each of the plurality of kinds of virtual containers in any of the group of devices composing the cluster.

Another aspect of the principle of the present invention is a system including: a robot application management device that executes a robot application by executing a plurality of kinds of virtual containers in cooperation with each other; and at least one robot device and at least one computer device that are connected to the robot application management device via a local area network, wherein the system further includes: means for managing the group of devices in the system as a cluster for executing the robot application; and means for placing and activating each of the plurality of kinds of virtual containers in any of the group of devices composing the cluster.

A further aspect of the principle of the present invention is a robot application management method for executing a robot application by executing a plurality of kinds of virtual containers in cooperation with each other, wherein a group of devices including at least one robot device and at least one computer device that are connected to a device that performs the robot application management method via a local area network are managed as a cluster for executing the robot application, and each of the plurality of kinds of virtual containers is placed and activated in any of the group of devices composing the cluster.

A still further aspect of the principle of the present invention is a robot application management program that executes a robot application by executing a plurality of kinds of virtual containers in cooperation with each other, including: a program code for managing a group of devices including at least one robot device and at least one computer device that are connected to a device in which the robot application management program is installed via a local area network as a cluster for executing the robot application; and a program code for placing and activating each of the plurality of kinds of virtual containers in any of the group of devices composing the cluster.

In each of the aspects of the principle of the present invention, the plurality of kinds of virtual containers include a first kind of virtual container that is capable of choosing any device as a device for executing the virtual container, and a second kind of virtual container that involves a physical connection in the robot device and therefore has a restriction on the choice of a device for executing the virtual container, the first kind of virtual container and the second kind of virtual container are loosely coupled for operation, and placement of the second kind of virtual container is achieved by choosing a device that meets the restriction.

Advantageous Effects of Invention

According to the present invention, the complexity of management and control of a computation resource and a network environment by a developer or administrator of a robot system can be reduced, and the use of a computer resource of a distributed computation system can be optimized in a robot system having a physical restriction, for example.

BRIEF DESCRIPTION OF THE DRAWINGS

FIG. 9 is a diagram showing an example of a mechanism that achieves placement of a virtual container having a restriction on the choice of a device that executes the virtual container in the present system.

DESCRIPTION OF EMBODIMENT

Figure 1:
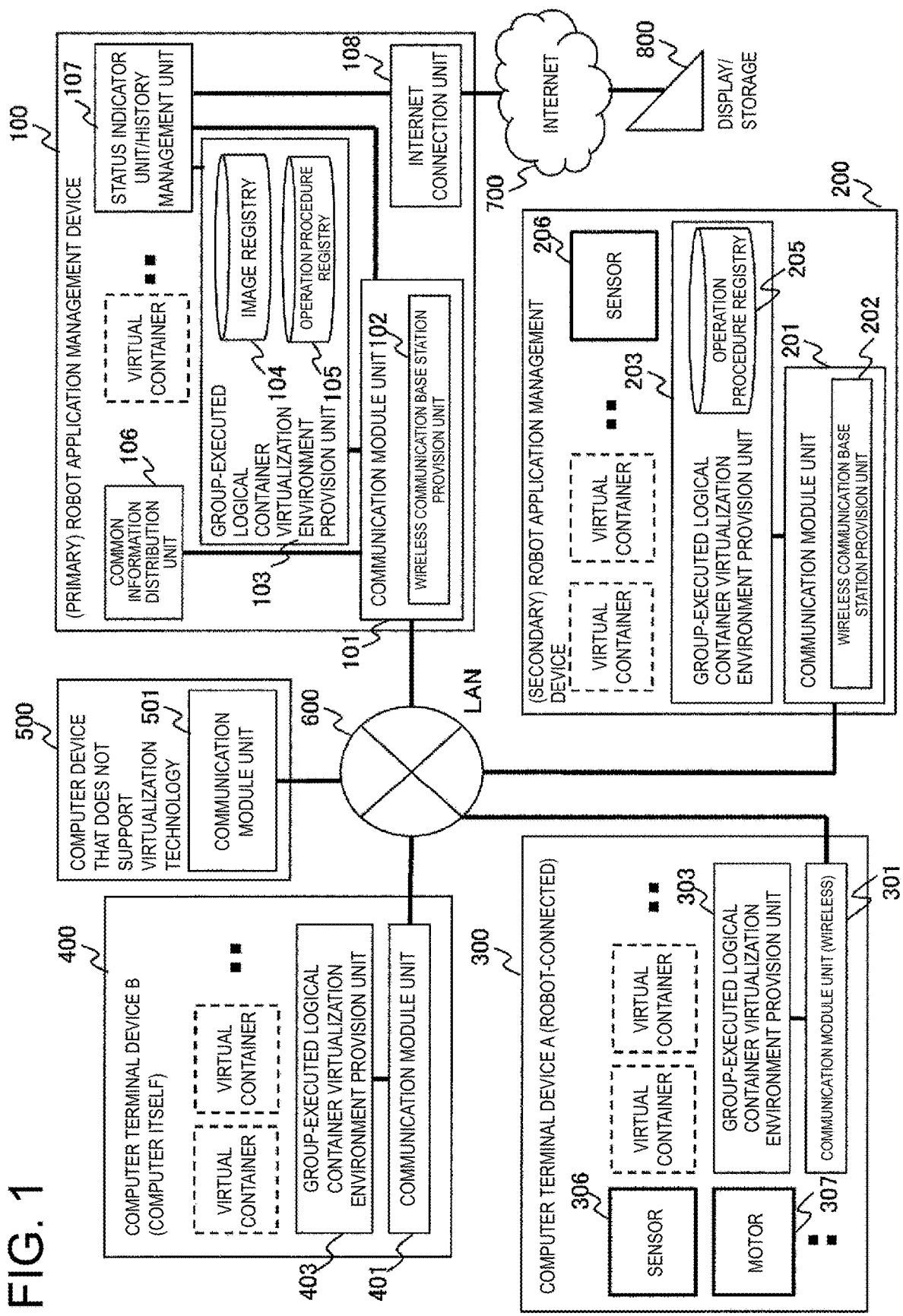
FIG. 1 is a diagram showing an example of a configuration of a system according to an embodiment of the present invention (referred to as the "present system" hereinafter).

In the following, an embodiment of the present invention will be described. The following description is given to show specific examples of the present invention and is not intended to limit the scope of the present invention.

In the aspects of the principle of the present invention described above, the group of devices composing the cluster may include at least one cloud service device connected to the robot application management device via an external network.

In that case, in addition to the plurality of computer devices (which include the robot device and the robot application management device since the devices have a computer resource) composing the system in the local area network, the cloud service device on the far side of the external network can also be handled as a member of the cluster, and the use of the computer resource can be further optimized. For example, a virtual container for performing a task that is required to quickly respond can be placed in a device in the local area network, and a virtual container for performing a task that involves analysis of a large volume of data can be placed in the cloud service device.

In the aspects of the principle of the present invention described above, the plurality of kinds of virtual containers may include a third kind of virtual container that requires a predetermined or higher processing or storage capacity and therefore has another restriction on the choice of a device for executing the virtual container, the third kind of virtual container and the first and second kinds of virtual containers may be loosely coupled for operation, and placement of the third kind of virtual container may be achieved by choosing a device that meets the another restriction.

In that case, a virtual container for performing a task that involves a direct connection (USB connection, for example) to a physical element, such as a motor or a sensor, mounted on the robot device can be placed in the robot device, and a virtual container for performing a task that is required to operate on a computer device having a particular capability can be placed in such a computer device (a device having a graphics processing unit (GPU) or a device having a large amount of memory, for example).

The loose coupling between the virtual containers can be easily achieved by the topic communication model of the ROS, for example.

In the aspects of the principle of the present invention described above, the robot application management device may further include means for storing a procedure for placing and activating each of the plurality of kinds of virtual containers in any of the group of devices composing the cluster.

In that case, for example, the developer or administrator of the robot system can be freed from the task of manually login to each device composing the robot system and individually executing or maintaining a process.

In the aspects of the principle of the present invention described above, the robot application management device may further include means for storing information about which restriction each of the group of devices composing the cluster meets.

In that case, for example, a procedure that describes that the virtual container that has any restriction on the choice of a device for executing the virtual container is placed and activated in a device that meets the restriction can be stored as the procedure described above. By referring to the information about which restriction each device meets when performing the procedure, a device in which the virtual container is to be placed can be automatically chosen.

In the aspects of the principle of the present invention described above, the robot application management device may further include means for storing an executable program for each virtual container, and the device in which each of the plurality of kinds of virtual containers is placed can obtain the executable program for the virtual container.

In that case, for example, each device can automatically obtain an executable program (referred to also as an image) that is an entity of the virtual container specified for the device by the procedure described above, and the developer or administrator of the robot system can perform placement and activation of each virtual container without manually logging in to the corresponding device.

In the aspects of the principle of the present invention described above, the executable program for the virtual container may be a package of an application program and an operating system (OS) that form the robot application, a separate space for each virtual container may be formed on a host OS of each device, and the executable program may be executed in such a manner that the executable program appears to the host OS as if the executable program is a process.

As described above, according to the aspects of the principle of the present invention, the container-based virtualization technology can be used for robot systems.

The virtual container can be realized using the existing virtual container runtime technology. The virtual container runtime is container management software itself and can automate deployment (placement and activation in a computer) of an application in a software container (which is referred to as a virtual container). According to the aspects of the principle of the present invention, since one robot application is executed by executing a plurality of kinds of virtual containers in cooperation with each other, the application in the software container that corresponds to one virtual container provides a part of the functions of the robot application.

In addition, placement and activation of the virtual containers in the plurality of devices composing the cluster can be achieved using the existing virtual container orchestration tool technology. The virtual container orchestration tool can automate setting, building and deployment of virtual containers in a plurality of computer devices (referred to also as nodes or hosts) and thus can realize simplification of alive monitoring, automatic restart or updated distribution of a process, for example. In the aspects of the principle of the present invention, it is desirable to use a tool technology that can place a predetermined restriction on a destination of automatic placement by using a label or the like.

As the virtual container runtime technology described above, "Docker" available from Docker, Inc., "Rkt" available from CoreOS., Inc., LXC available from Linux (registered trademark) Foundation, or "Hyper-V" available from Microsoft Corporation can be used, for example.

As the virtual container orchestration tool technology, "Docker Swarm" (see Non-Patent Literature 2), "Kubernetes" (see https://kubernetes.io/), "Rancher" (see https://rancher.com/), or "flet" (see https://coreos.com/fleet/docs/latest/launching-containers-fleet.html) can be used, for example.

In the aspects of the principle of the present invention described above, the robot application management device may further include means for keeping the robot application being executed when malfunction of any of the group of devices composing the cluster occurs, by relocating the virtual container operating on the malfunctioning device to another device composing the cluster and activating the virtual container on the another device, and relocation of the virtual container that has any restriction on the choice of a device for executing the virtual container may be achieved by choosing a device that meets the restriction, and execution of the robot application may be stopped if there is no device that meets the restriction other than the malfunctioning device.

In that case, the computer resource of the distributed computation system can be optimally used in a robot system having a physical restriction, and at the same time, when malfunction of a device composing the cluster occurs (such as when a computer device itself has failed, when the robot device has left from the effective range of the local area network, or when the cloud service device cannot be confirmed to be normally operating because of a loss of the communication with the cloud service device via the external network, for example), the robot system can be automatically allowed to continue operating if the virtual containers on the malfunctioning device can be relocated to another device, and the robot system can be automatically stopped if the virtual containers on the malfunctioning device cannot be relocated.

In the aspects of the principle of the present invention described above, the virtual container that has any restriction on the choice of a device for executing the virtual container may be stateless, and when malfunction of any of the group of devices composing the cluster occurs, and execution of the robot application is stopped, if the malfunctioning device or a device that replaces the malfunctioning device is recovered as a device composing the cluster, execution of the robot application may be restarted by placing and activating the virtual container in the recovered device.

In that case, for example, when the robot device has left the effective range of the local area network and the robot system is stopped, the robot system can be automatically restarted if the robot device enters the effective range of the local area network again. As another example, when the robot device has failed and the robot system is stopped, the robot system can be automatically restarted by activating another robot device in the effective range of the local area network.

In the aspects of the principle of the present invention described above, the robot application management device may further include: means for stopping the virtual container when the device in which the virtual container is activated leaves the cluster; and means for storing a procedure for stopping the virtual container.

In that case, for example, the virtual container can be automatically stopped if a certain condition is satisfied. If a device composing the cluster leaves the cluster because of malfunction, the virtual container on the device corresponding to the cluster can be automatically stopped (or the virtual container can be discarded from the device) to improve safety.

In the aspects of the principle of the present invention described above, the robot application management device may further include means for collecting information about a state of each of the plurality of kinds of virtual containers including in which device the virtual container is placed and whether the virtual container is operating or not, and transmitting the information to at least one of a service that presents the information to a user or a service that stores a history of the information.

In that case, for example, the states of the devices composing the robot system can be centrally displayed on a terminal connected to the robot application management device via the local area network or the external network, so that the burden on the developer or administrator (user) of the robot system can be reduced. Furthermore, a detailed log of controls performed on the robot system or operations of the robot system can be stored in a storage connected to the robot application management device via the local area network or the external network. Such a terminal or storage may be a device that does not a cloud service device.

In the aspects of the principle of the present invention described above, the robot application management device may further include means for assisting a network connection to enable the virtual containers in the devices composing the cluster to communicate with each other via the local network, and the robot application management device may be provided with at least a part of the means as a result of one of the plurality of kinds of virtual containers being placed and activated in the robot application management device.

In that case, for example, the developer or administrator of the robot system can be freed from the task of manually performing settings (such as time synchronization, address assignment, name resolution) for network connection in each of the devices composing the robot system. The communication between the virtual containers on each device thus set for network connection may be assisted by the virtual container runtime/virtual container orchestration tool technology.

In the aspects of the principle of the present invention described above, the at least one robot device may include a mobile robot, at least a connection of the local network to the mobile robot may be a wireless connection, and the robot application management device may have at least one of an access point function and a multi-hop function for the wireless connection.

The access point function allows the mobile robot and various devices (sensors or computers) to be interconnected to form the robot system, and the multi-hop function allows a wireless local area network to be flexibly adjusted to the range of movement of the mobile robot. As a result, the mobile robot can move around without regard to the wireless communication range.

In the aspects of the principle of the present invention described above, the group of devices composing the cluster may include at least one secondary robot application management device that includes at least some of the means provided in the robot application management device.

In that case, even if the robot application management device serving as a primary robot application management device goes down, the secondary robot application management device can replace the primary robot application management device to keep the robot system operating. In addition, the wireless multi-hop function may be deployed in the secondary robot application management device. Furthermore, when there is a plurality of robot systems, if the primary robot application management device is shared and a secondary robot application management device having the access point function is installed in each robot system, each robot device can use a nearby access point for wireless communication.

In the aspects of the principle of the present invention described above, the robot application management device may be located at a boundary between the local area network and an external network, and the robot application management device may further include means for protecting each device connected to the local area network from the external network.

In that case, the local area network for the robot system can be separated and protected from the external network (using NAT (Network Address Translation) or firewall, for example) to improve security. For example, when the secondary robot application management device is installed in each robot system as described above, the primary robot application management device shared by the plurality of robot systems can be provided with the network separation and protection function.

Furthermore, if the robot application management device having the network separation and protection function and the cloud service device on the far side of the external network are connected using a virtual private network (VPN), security can be further ensured. Alternatively, an encrypted communication protocol, such as HTTPS or MQTTS, can also be used.

In the aspects of the principle of the present invention described above, the robot application management device may further include a sensor that provides data on a physical environment for the robot application, and a virtual container that controls the sensor may be placed as one of the plurality of kinds of virtual containers and activated in the robot application management device.

In that case, for example, the robot system can be controlled based on both information from the sensor mounted on the robot device (that is, the sensor that moves while sensing) and information from the sensor mounted on the robot application management device (that is, the sensor that senses the environment of the range of movement of the robot device). When the secondary robot application management device is installed in each robot system as described above, the sensor may be provided in the secondary robot application management devices.

In the aspects of the principle of the present invention described above, the robot application management device may further include means for assigning an address for network connection to enable at least one virtual container in at least one of the devices composing the cluster to communicate with a device that does not form the cluster via the local network.

In that case, a device that supports the virtual container technology and a device that does not support the virtual container technology can be mixed in the robot system, so that development and administration of the robot system can be started from partial introduction of the virtualization technology.

Each of the aspects described above may be modified to form another aspect in a different category, combined with another aspect to form a further aspect, or partially extracted to form another aspect. For example, a program installed in any device composing the system to perform the method described above, a device other than the robot application management device composing the system described above, a method performed in the device and a program for performing the method, a storage medium storing any of the programs described above can each be an aspect of the principle of the present invention.

Furthermore, although the aspects of the principle of the present invention described above include handling a virtual container that has a restriction on the choice of a device for executing the virtual container, an aspect that includes the means or the like described above but does not include such a virtual container can also be an invention (which is independent from the present invention).

In the following, for illustrative purposes, a system according to an embodiment of the present invention (referred to as "the present system" hereinafter) will be described with reference to the drawings. In the example described below, Docker is used as the virtual container runtime, and Docker Swarm is used as the virtual container orchestration tool.

The present system illustrated in FIG. 1 includes a robot (a physical element such as a sensor or a motor), a (primary)

robot application management device 100 that is an edge computer intended to provide a network environment building support and a program development and execution environment required for development of a robot system and execution of a program over a local network (LAN 600), a (secondary) robot application management device 200 that is responsible for at least part of the functions of the (primary) robot application management device 100 in a redundant manner, and a plurality of computer resources (computer terminal devices) 300 and 400 that can be managed or controlled by the robot application management devices.

A computer terminal device A (300) is robot-connected and includes a sensor 306 and a drive 307. A computer terminal device B (400) is a computer itself. The robot application management devices and the computer terminal devices are devices that support the virtual container technology and include group-executed logical container virtualization environment provision units 103, 203, 303 and 403, respectively. A plurality of virtual containers operating in the devices cooperate to execute one robot application (or make one robot system operate).

The present system can accommodate a computer device 500 (such as a smartphone or a personal computer) on the LAN 600 that does not support the virtual container technology. In this example, the (primary) robot application management device 100 has a function of connecting the LAN 600 to an internet 700. The present system can accommodate a computer device (display/storage) 800 that does not support the virtual container technology via the internet 700.

The internet 700 can be any communication network that can be accessed by an external computer resource (the computer device 800 in the example in FIG. 1). The internet 700 may be a cellular network, such as LTE, or a public Wi-Fi network. The (primary) robot application management device 100 includes an internet connection unit 108 (such as a network interface card for wired LAN connection), and can connect to the internet 700 via a broadband router 109 as shown in the example in FIG. 3.

Although the (primary) robot application management device 100 and the display/storage 800 are connected to each other via the internet 700 in the example shown in FIG. 1, the display/storage 800 may be provided on the LAN 600, and the present system may be built as a closed system in the LAN.

The robot application management devices, the computer terminal devices and the computer device that does not support the virtual container technology include communication module units 101, 201, 301, 401 and 501 for connecting to the LAN 600, respectively. Although the communication module units can connect to each other via a wired network, at least the computer device 300, which is directly connected to a mobile robot, is preferably capable of connecting to the other devices via a wireless network, such as a Wi-Fi network. The Wi-Fi network is a practical option since the network can handle high-volume data, such as an image, a sound or a point cloud, and is suitable for indoor use.

In order to provide a multi-hop Wi-Fi access point environment, not only the (primary) robot application management device 100 but also the (secondary) robot application management device 200 include a wireless communication base station provision units 102 and 202 (such as wireless LAN adapters compliant with the Wireless Distribution System (WDS) standard), respectively. WDS supports a function of transmission, reception and relay of wireless LAN signals to expand the communication range. This enables the Wi-Fi network to completely cover the area in which the mobile robot moves as far as a power supply is available.

The group-executed logical container virtualization environment provision unit 103 of the (primary) robot application management device 100 has a manager function (Docket Swarm Manager) for a virtual container orchestration tool, and bundles a group of devices composing a robot system into a cluster (or performs clustering of a group of devices composing a robot system) for management by referring to an operation procedure registry storage unit 105. The group-executed logical container virtualization environment provision units 303 and 304 in the devices to be managed has an agent function (Docker Swarm Agent) for the virtual container orchestration tool.

The group-executed logical container virtualization environment provision unit 203 in the (secondary) robot application management device 200 has a manager function for the virtual container orchestration tool. In cooperation with the (primary) robot application management device 100, the group-executed logical container virtualization environment provision unit 203 manages the group of devices composing the robot system by referring to an operation procedure registry storage unit 205. The computer resource of the robot application management device may be used for executing a robot application as with the computer resource of the computer terminal device. In that case, the group-executed logical container virtualization environment provision units 103, 104 also have the agent function for the virtual container orchestration tool.

The group-executed logical container virtualization environment provision unit 103 of the (primary) robot application management device 100 includes an image registry storage unit (Docker registry) 104, and manages an executable program (Docker image) that is an entity of the virtual container operating in each device composing the robot system. The group-executed logical container virtualization environment provision unit 203 of the (secondary) robot application management device 200 may store the whole or a part of an image registry.

The group-executed logical container virtualization environment provision unit 103 of the (primary) robot application management device 100 allows standard outputs and standard errors of the virtual containers to be collected to one location and allows a plurality of virtual containers to be activated, arranged and stopped across host machines (devices composing the cluster) as described in a configuration file (operation procedure registry) with one command. Furthermore, as described later, if the virtual container is a stateless application, each service can be easily scaled up or down.

The group-executed logical container virtualization environment provision unit 103 of the (primary) robot application management device 100 allows a status indicator unit 107 of the (primary) robot application management device 100 to acquire a list of operating states of services operating in the virtual containers across host machines (devices composing the cluster). The list can be checked on a display 800 or the like by a user of the robot system, for example.

As can be seen, providing the robot application management devices allows virtual containers distributed among a plurality of host machines to be handled in a centralized manner. Therefore, operation and monitoring can be optimized.

Furthermore, the (primary) robot application management device 100 may include a common information distribution unit 106 (including a common information registry storage unit (not shown)) to build a network environment for the robot system. At least part of the building of the network environment can also be achieved by a virtual container on the (primary) robot application management device 100 or another device in the same cluster as the (primary) robot application management device 100.

The building of the network environment achieved as described above may include time synchronization (automatic time setting using a network time protocol), name resolution (address resolution with a host name using a domain name system), address assignment (automatic assignment of an IP address using a dynamic host configuration protocol or the like), and directory service (centralized management of account information using a lightweight directory access protocol or the like), for example. These components allow the network application executed by the virtual container on the robot application management device to automatically synchronize all the computers even if the robot system is built on an enterprise network that restricts the connection to a public NTP server, for example.

The (primary) robot application management device or the (secondary) robot application management device may include a sensor 206. The sensor 206 is an information collection device, such as an environmental sensor or a camera, and the robot application management device may include a plurality of such sensors. The sensors can be controlled by virtual containers operating for the respective sensors, the virtual containers can cooperate to form a sensor network.

The robot application management device may further have a robot application development environment. The robot application management device may also have a mechanism that detects positional information about a mobile robot or a server function that distributes a map.

The robot application management device can be mainly targeted at a mobile robot using the ROS. In that case, the robot application management device can provide an environment based on a network technology and a virtualization technology while serving as a Wi-Fi access point.

Figure 2:
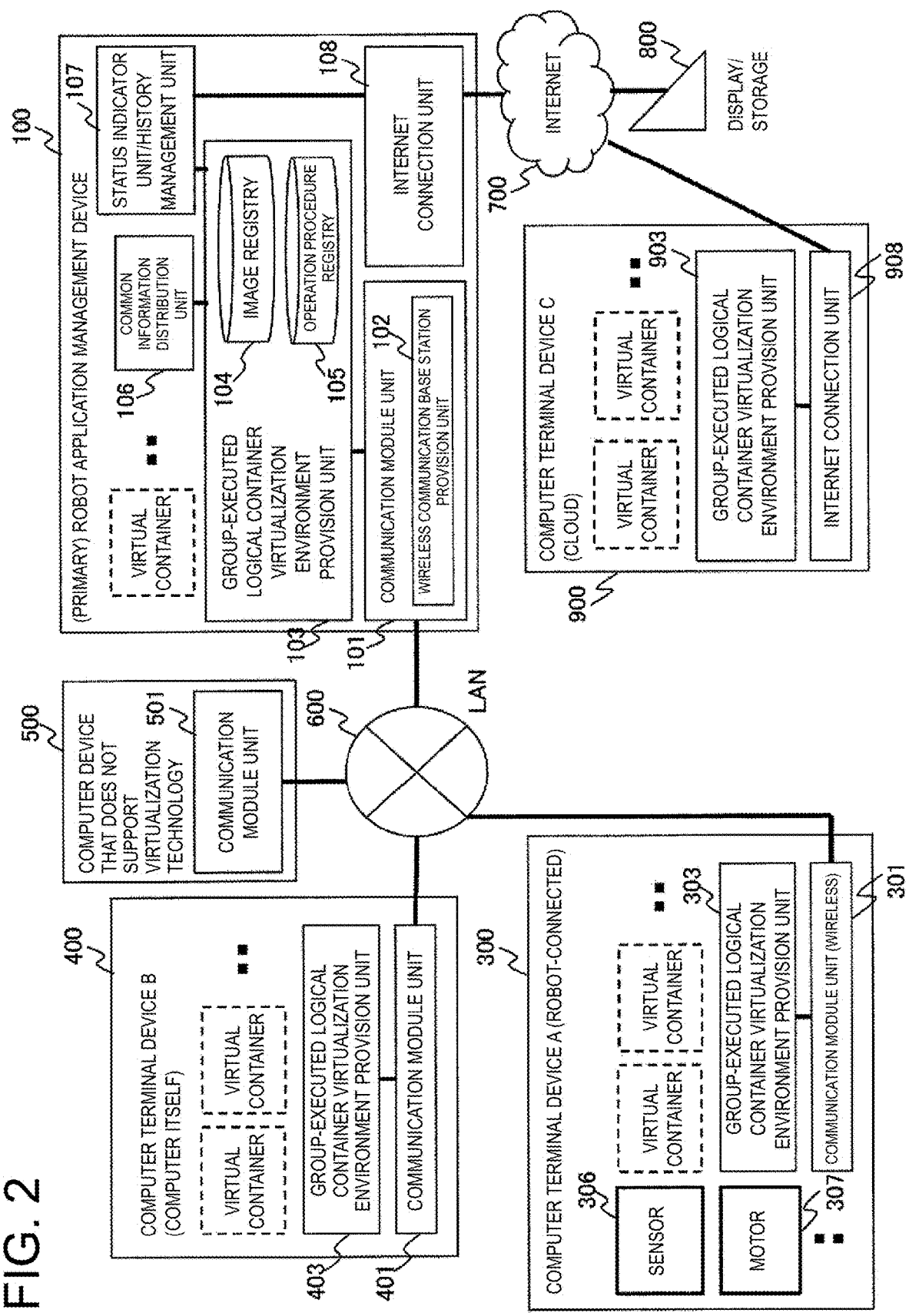
FIG. 2 is a diagram showing another example of the configuration of the present system.

In the present system illustrated in FIG. 2, the (primary) robot application management device 100 connects to a cloud service device (such as IaaS) 900, which includes a group-executed logical container virtualization environment provision unit 903, via the internet 700, and virtual containers operate in an environment that includes the cloud service device 900 as one of the group of devices composing the robot system.

A common cloud service (such as PaaS or SaaS) that does not support the virtual container technology may be connected to the (primary) robot application management device 100 via the internet 700, and the whole or part of the information concerning control or operating state of the robot system collected from the communication module unit 101 by a history management unit 107 may be stored in the storage 800 provided by the cloud service.

In the example in FIG. 2, the (primary) robot application management device 100 serves as edge equipment between the cloud service and the robot. The (primary) robot application management device 100 can build a local area network for the robot system as an environment separated from the other networks, so that the computer resource can be optimally distributed. For example, virtual containers for services that are required to quickly respond or require communication security can be placed in the local area network, and virtual containers for the other services can be placed in the cloud service device.

If the internet connection unit 108 of the (primary) robot application management device 100 and an internet connection unit 908 of the cloud service device 900 have a VPN gateway function, communication security can be ensured even if the external computer resource is used.

Although the (secondary) robot application management device 200 is not provided in the example in FIG. 2, the (secondary) robot application management device 200 can also be provided, of course. Conversely, in the configuration example in FIG. 1, the (secondary) robot application management device 200 can also be omitted.

Figure 3:
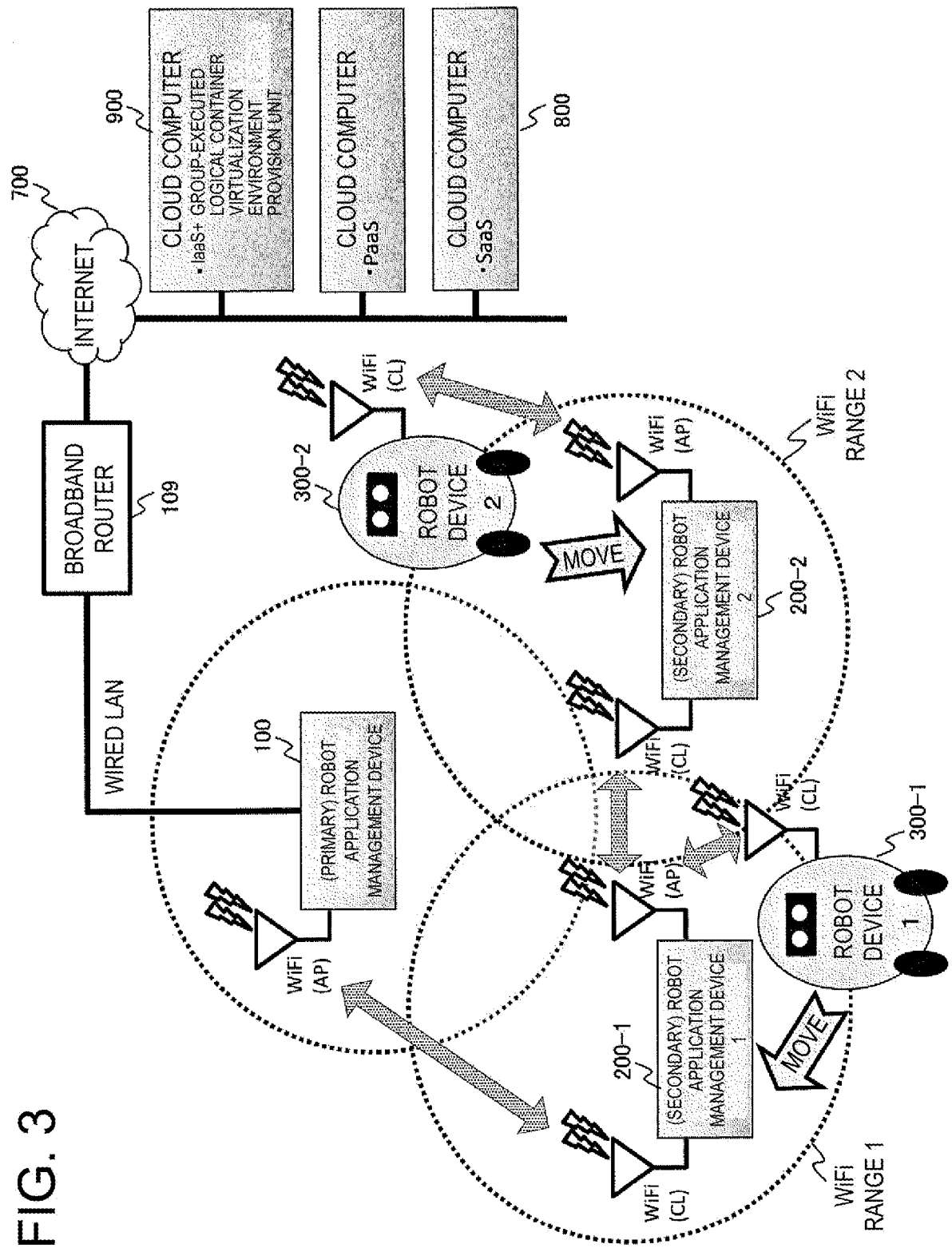
FIG. 3 is a diagram showing an example of use of the present system.

FIG. 3 shows an example of the present system in which a robot system A for a robot device 1 (300-1) and a robot system B for a robot device 2 (300-2) are operating. In the drawing, Wi-Fi (AP) represents a wireless access point, and Wi-Fi (CL) represents a wireless client. The robot device 2 wirelessly communicates with a (secondary) robot application management device 200-2, which is the closest access point. However, the robot device 2 can also wirelessly communicate with the (primary) robot application management device 100, which is out of the Wi-Fi range of the (secondary) robot application management device 200-2, owing to the multi-hop function of a (secondary) robot application management device 200-1.

For example, the robot system A may include the (primary) robot application management device 100, the (secondary) robot application management device 200-1, the robot device 300-1 and a computer device 400 (not shown), while the robot system B may include the (primary) robot application management device 100, the (secondary) robot application management device 200-2, the robot device 300-2 and the computer device 400 (not shown) (in short, host machines to be operated may be specified on a cluster basis).

Even when the robot systems A and B are service robots that operate in the same manner, a group of virtual containers for the robot system A and a group of virtual containers for the robot system B are separately generated. For example, two virtual containers for the robot systems A and B that offer the same service operate on the computer device 400.

Figure 4:
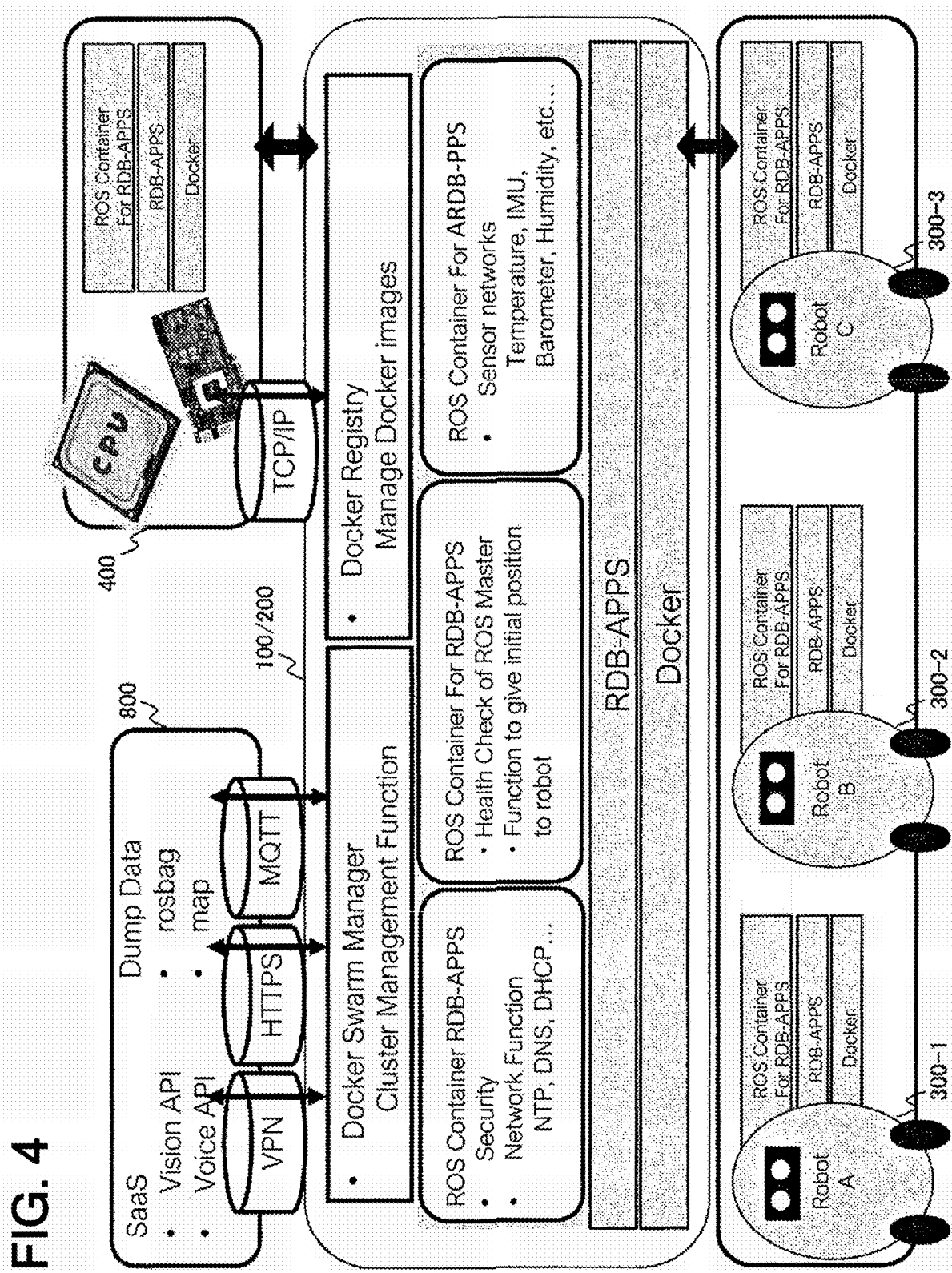
FIG. 4 is a diagram showing an example of implementation of the present system.

FIG. 4 shows an example of the present system implemented using the Docker technology. A robot system is built by building a virtual container-based clustered environment using "Docker", which is a virtual container runtime, and "Docker Swarm", which is a virtual container orchestration tool, on a plurality of computer resources including a robot application management device (referred to also as "RDB") 100/200, another computer device 400 and a robot device 300, and operating virtual containers for robots ("ROS Container For RDB-APPS" in the drawing).

In the example in FIG. 4, a processor of each of a plurality of computer devices (host machines) composing a cluster include "Docker", "RDB-APPS", and "ROS Container For RDB-APPS". "RDB-APPS" is a daemon that operates in an upper layer of "Docker" to separately operate virtual containers for various robots. If "Docker" and "RDB-APPS" are installed in a host machine, the host machine will be provided with the "group-executed logical container virtualization environment provision unit" described above with reference to FIGS. 1 and 2.

A computer device serving as the robot application management device may include the common information distribution unit 106 (having functions of NTP, DNS, DHCP and the like) that builds the network environment described above, a functional unit that performs health check of a robot environment, the status indicator unit/history management unit 107 that collects information concerning the operational state of a robot and transmits the information to the display/storage, or a functional unit that provides a robot application development environment, for example, as "ROS Container For RDB-APPS" on "Docker" and "RDB-APPS". These units allow a local area network and a development support environment dedicated for a robot to be built simply by arranging the robot application management device between the internet and the service robot.

"RDB-APPS" installed in each host machine can also be responsible for driver management for robot hardware, for example, in addition to the functions described above. For example, when activating a virtual container on the host machine, if the virtual container is linked with hardware, such as a motor (actuator) or any of various sensors, "RDB-APPS" can specify the version of the hardware to enable a driver for the hardware to be set up on the host machine. In that case, a device file is directly accessed, so that the advantage of the container-based virtualization can be taken that a problem with hardware connection is less likely to occur than the hypervisor-based virtualization.

In the example in FIG. 4, at least a part of "ROS Container (Docker container with OS and ROS setup) For RDB-APPS" (virtual container in FIGS. 1 and 2) can be implemented by a user of the robot system. In the Docker registry on the robot application management device, a standard "ROS Container" for "RDB-APPS" is placed, and the user of the robot system can perform Docker container-based robot system development using the standard ROS container. The Docker registry also allows instant duplication of any number of identical ROS environments.

In the robot system development described above, a Docker container image in which setup of an OS or middleware is completed is stored in the Docker registry, and only the difference from the container image is implemented when developing a robot application, so that the modification task can be improved in efficiency. Furthermore, one package is formed for one Docker image, so that environmental contamination can be prevented.

More specifically, first, a template image stored in the virtual container image registry storage unit 104 ("Docker registry") is used to enter only the difference from the template image in a virtual container creation procedure registry (referred to also as "Dockerfile"). Using the Dockerfile, a command to create a virtual container image is then executed, and a newly created image is named and stored in the Docker registry.

The Docker containers (virtual container in FIGS. 1 and 2) on the computer devices (the robot application management device and the other computer devices placed on the local area network or cloud) composing the cluster are monitored in a centralized manner by "Docker Swarm Manager" (included in the "group-executed logical container virtualization environment provision unit" 103/203), which is an application residing on the robot application management device.

Each computer device is assigned with a label to clarify the role thereof, and the "group-executed logical container virtualization environment provision unit" (including "Docker Swarm Agent", which is an application residing on the computer) of each computer device stores the assigned label. "Docker Swarm Manager" performs task assignment by referring to the label assigned to each computer device and choosing a computer device ("Docker Swarm Agent") that has a label suitable for execution of each virtual container.

In this way, activation and monitoring of the computer devices (nodes) and the virtual containers (processes) and the standard outputs from the computer devices and the virtual containers can be centrally handled by the robot application management device. Therefore, the user of the robot system can operate the robot system as if the robot system is formed by one computer device, regardless of the number of computer devices involved in the robot system.

Although an example has been described in which the robot application management device serves as a manager, another computer in the cluster can also serve as a manager. In that case, when participating in the cluster, each computer device chooses whether to serve as "Docker Swarm Manager" or "Docker Swarm Agent". Whether to serve as Docker Swarm Manager or Docker Swarm Agent is stored in the "group-executed logical container virtualization environment provision unit" of each computer device.

Furthermore, a cloud service useful for the robot is available through the robot application management device according to a protocol, such as VPN, HTTPS or MQTT. For example, SaaS (Vision API, Voice API, machine learning or other service) required for the robot to operate is available.

On the storage 800 having high data integrity and availability provided as a cloud service described above, dump data, such as rosbag, may be stored. Various kinds of data required for management of robot operation may be extracted (filtered out) from collected data and stored.

The robot application management device does not have to be used for the Docker container-based robot system development. Even when the conventional ROS development approach is used, much of the convenience provided by the robot application management device, such as various network infrastructure functions, can be enjoyed. Furthermore, only part of the functions may be Docker-containerized, and whether to containerize the whole or part of the functions can be determined based on the convenience of the user of the robot system.

Figure 5:
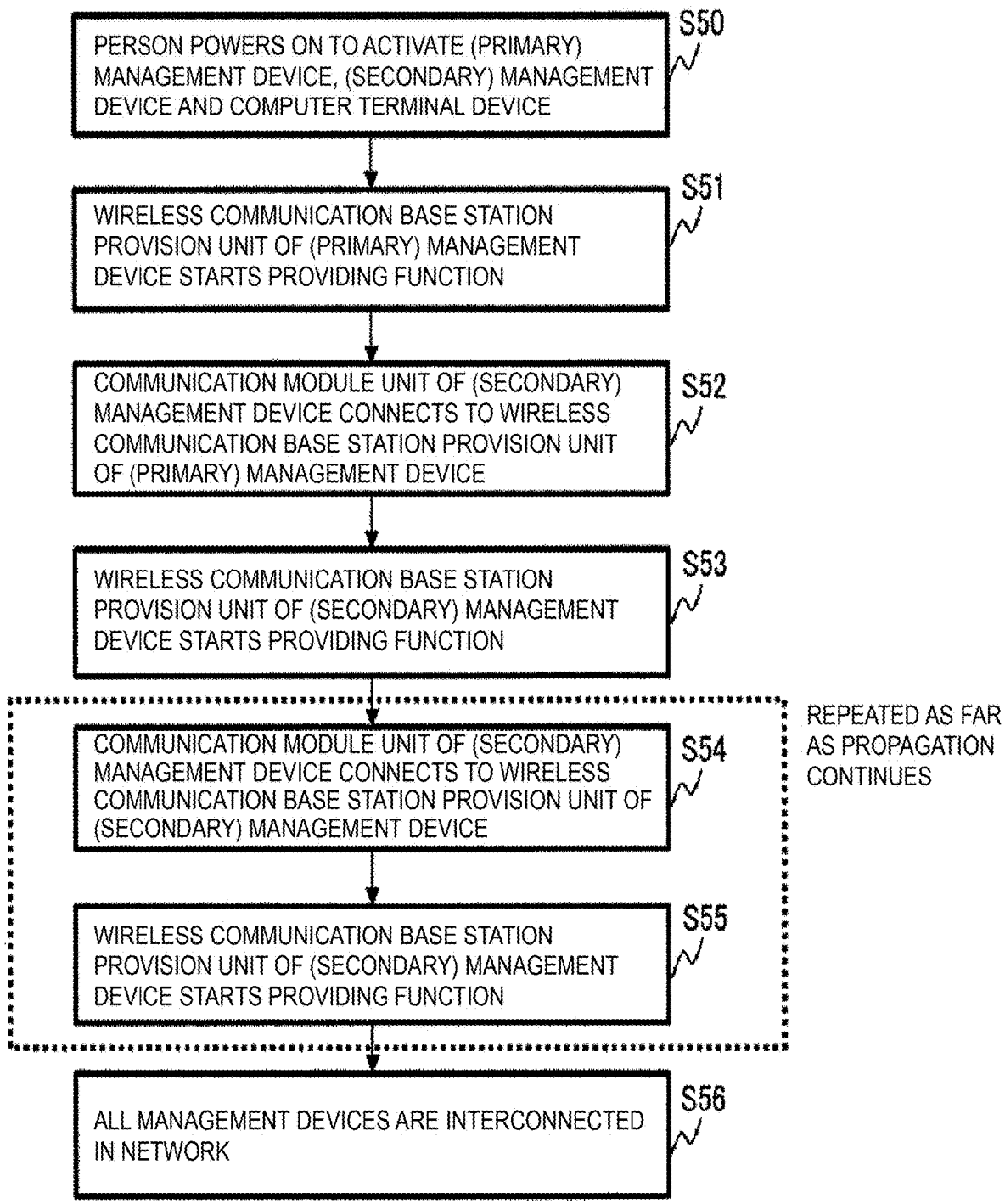
FIG. 5 is a diagram showing an example of a flow of an operation of a communication module unit and a wireless communication base station provision unit of a robot application management device.

FIG. 5 shows an example of a flow of an operation in which the wireless communication base station provision units 102 and 202 (Wi-Fi access point) and the communication module unit 201 (Wi-Fi client) of the robot application management devices 100 and 200 expand the Wi-Fi range using the multi-hop function as shown in FIG. 3.

Figure 6:
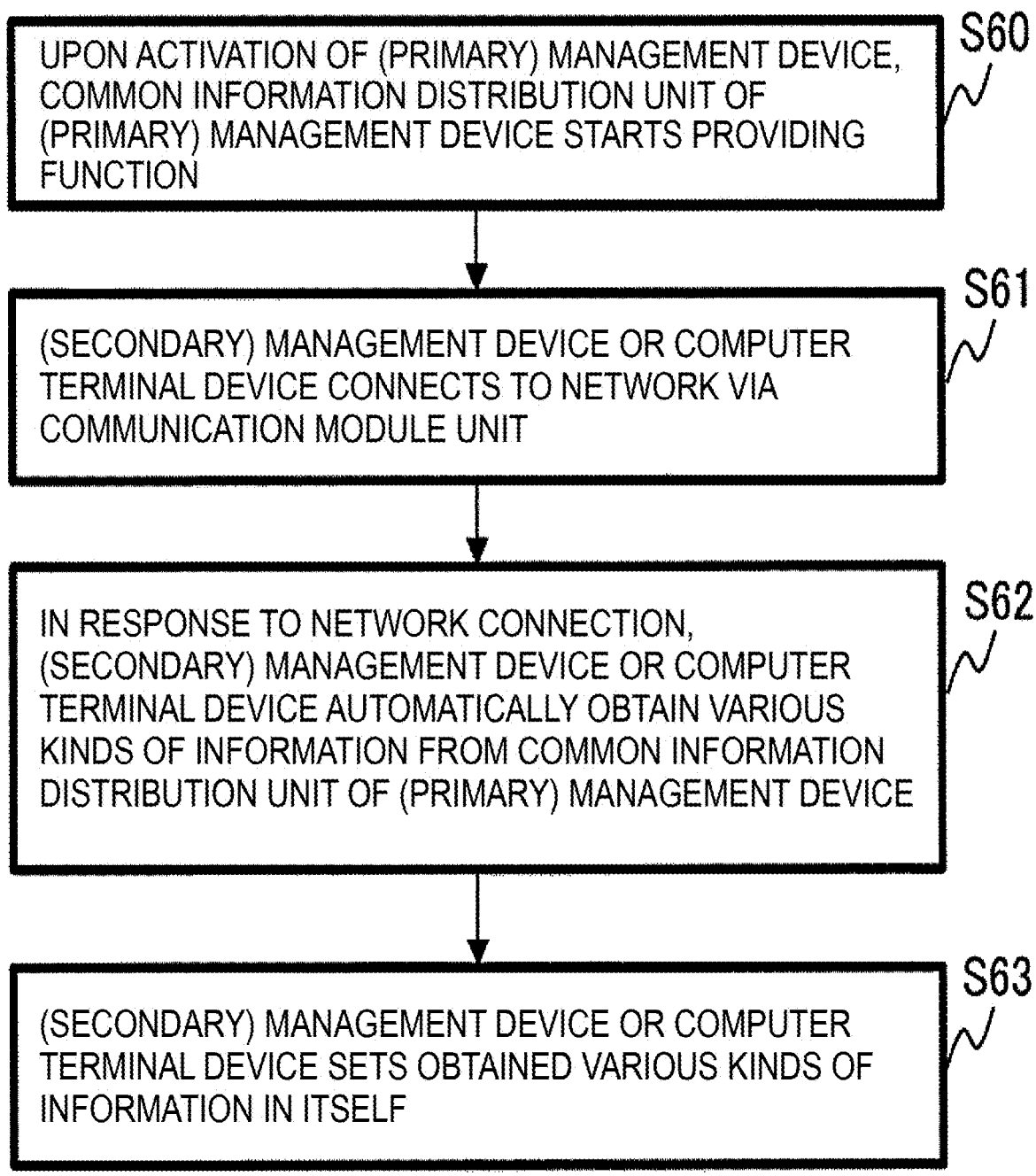
FIG. 6 is a diagram showing an example of a flow of an operation of a common information distribution unit of the robot application management device.

FIG. 6 shows an example of a flow of an operation in which the common information distribution unit 106 (or a virtual container that performs network environment building) of the robot application management device 100 and the communication module units 201, 301 and 401 of the robot application management device 200 and the computer terminal devices 300 and 400 cooperate to allow a plurality of computer devices composing a cluster to communicate with each other over a local area network.

Figure 7:
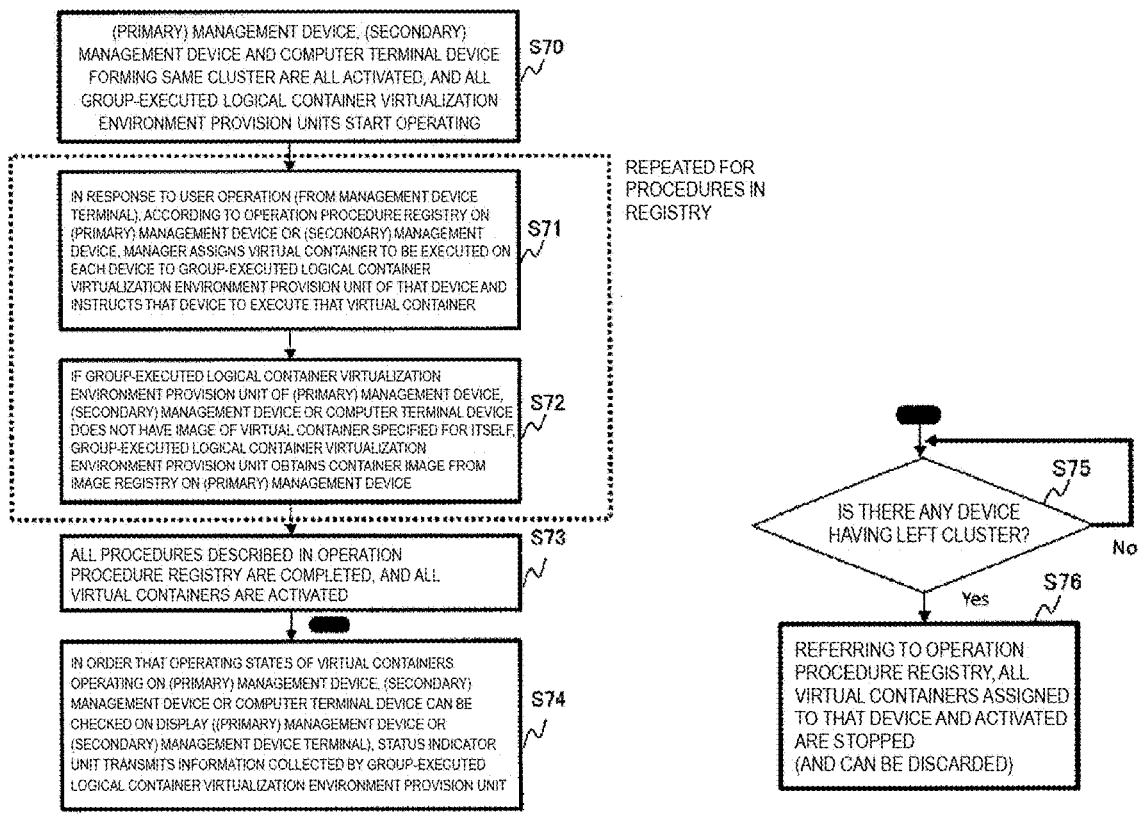
FIG. 7 is a diagram showing an example of a flow of an operation of group-executed logical container virtualization environment provision units of the robot application management device and a computer terminal device.

FIG. 7 shows an example of a flow of an operation of implementing the present system using the Docker technology. In this example, the group-executed logical container virtualization environment provision units 103, 203, 303, 403 and 903 of the robot application management devices 100 and 200 and the computer terminal devices 300, 400 and 900 form one cluster that provides one or more robot systems (information on the group of devices composing the cluster is also stored in the "group-executed logical container virtualization environment provision units"), and a manager operates on the robot application management devices 100 and 200 to create (S72) or destroy (S76) each Docker container on the plurality of agents.

The manager performs deployment (instruction to locate and activate) of each Docker container on each computer device by reading in an operation procedure (described in yml, for example) stored in the virtual container operation procedure registry storage unit 105 (S71). The "Docker Swarm Manager" monitors (pools) the computer resources of the "Docker Swarm Agents" subordinate to the Docker Swarm Manager (that is, belonging to the same cluster) across the host machines, and manages placement of the virtual containers in a transparent manner (S73). Therefore, when a device belonging to the cluster has left the cluster (S75), of the virtual containers having operated on the device, any virtual container that can continue operating on another device is relocated to and activated on the other device. The virtual containers having operated on the device having left the cluster are stopped and discarded as required.

Figure 8:
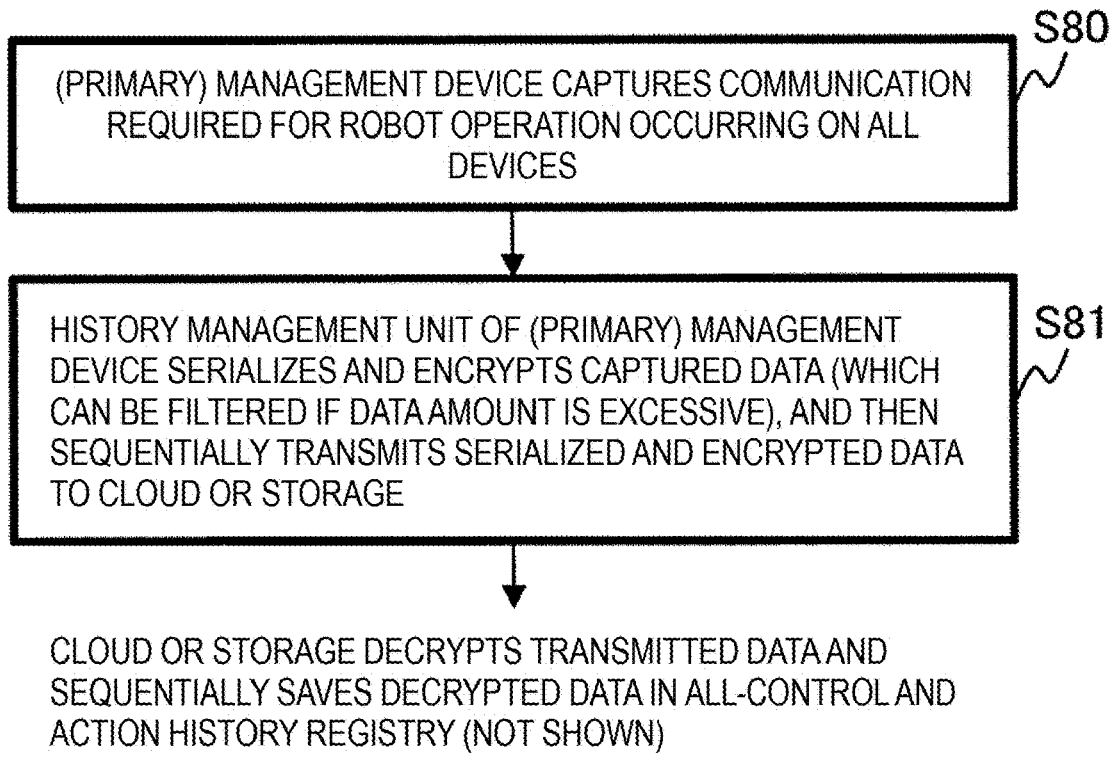
FIG. 8 is a diagram showing an example of a flow of an operation of a history management unit of the robot application management device.

FIG. 8 shows an example of a flow of an operation of the history management unit 107 of the robot application management device 100 in the case where the present system is implemented using the Docker technology. An example of an operation of the status indicator unit 107 of the robot application management device 100 is shown in FIG. 7 (S74).

Even if the clustered environment based on the virtual container technology includes a device (such as a robot) having some restriction, the present system provides a function that enables the device to be implemented in compliance with the design guidelines for optimizing the use of the computer resources.

FIG. 9 shows an example of a mechanism for realizing placement of a virtual container that is restricted in the choice of the device that executes the virtual container when the present system is implemented using the Docker technology.

In the default operation of "Docker Swarm Manager" (application deployment automation tool), the computer resources are handled in a transparent manner, so that a computer determined to be optimal by the manager is chosen as a host computer to execute the virtual container.

The virtual containers described below are not placed on the host computer chosen by default but is placed on a designated host computer.

1. A virtual container for an application that involves physical connection (such as USB connection).
2. A virtual container for an application that requires for operation a computer resource having a particular function, such as a GPU or a large amount of memory.

To place the virtual container on the designated host computer, a label function is used as illustrated in FIG. 9(*a*). "Docker Swarm" assigns a label to each agent (node) in advance (the label is stored in the "group-executed logical container virtualization environment provision unit" when the cluster is set up). In the drawing, any of labels "dev", "test" and "prod" is assigned to a label item "environment", and any of labels "disk" and "ssd" is assigned to a label item "storage". Although not shown, a label indicating whether a computer resource is edge equipment (another example of the computer resource having a particular function described above) may be specified.

When executing an application, a virtual container is deployed by referring to the yml description illustrated in FIG. 9(*b*). The yml description contains the definition of the label relating to the executing node, for example, and only the agent ("ssd" in this example) that matches with the label specified as "service/db/deploy/placement/constraints/node-.labels.storage" is designated as a host machine on which the virtual container can operate. In FIG. 9(*a*), three of five agents satisfy the condition and are designated as host machines, and the virtual container for the service "db" is deployed in only any of these three agents. In this way, the host machine that will operate can be controlled (only a particular node can be allowed to operate).

In order to minimize the range of the influence of the restriction from many physical connections in the robot system, a virtual container having a restriction from the physical connection is preferably created to have no record of previous interactions (that is, to be stateless) (if it is required to have a record of interactions, the record is kept outside the virtual container, for example). Another possible design principle in creating a virtual container in a robot system is to separate a computer resource that cannot be mounted on the robot (for example, a computer resource that is heavy or requires a large capacity power supply) and minimize the use of the computer resource on the robot.

Figure 10:
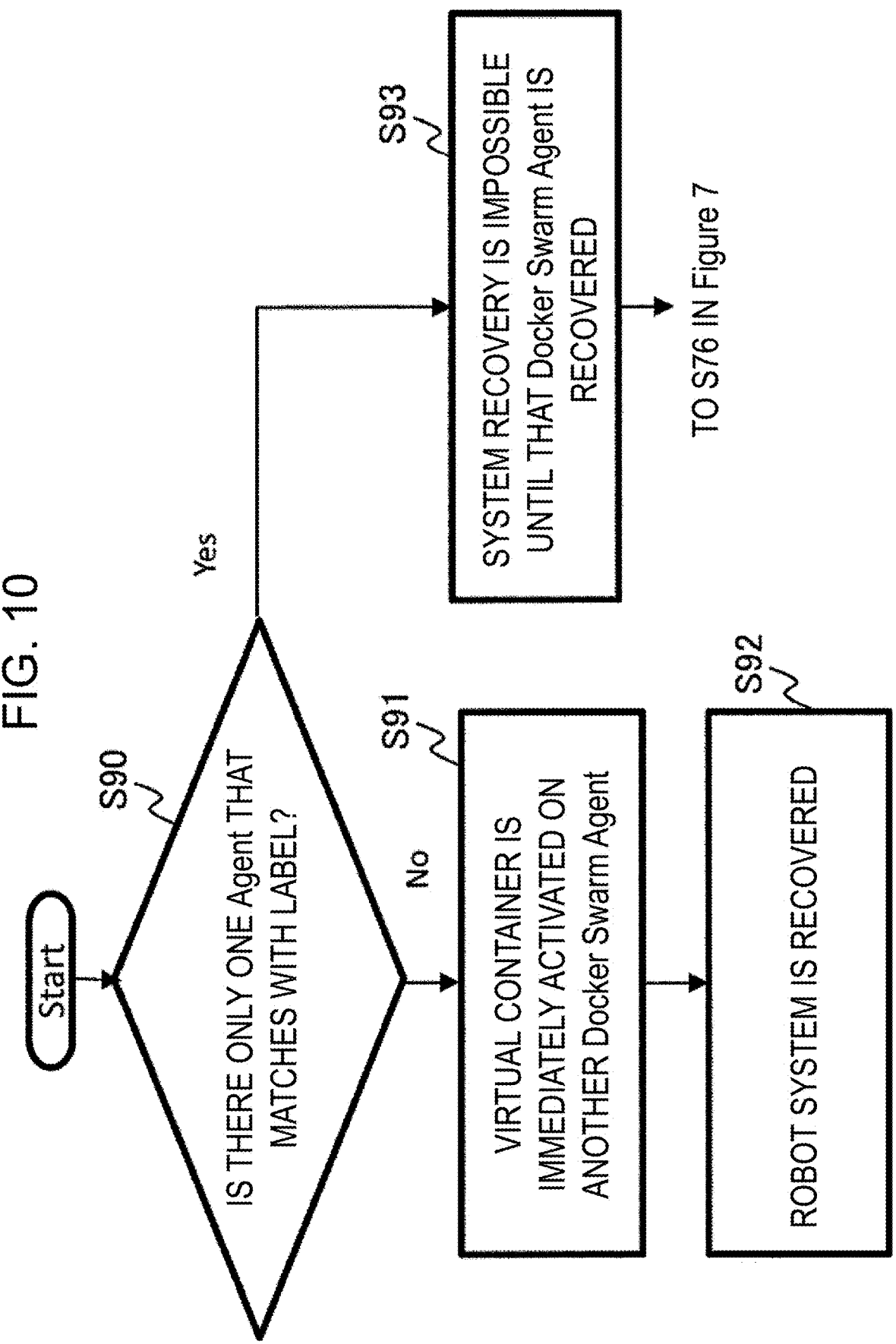
FIG. 10 is a diagram showing an example of a flow of an operation of coping with a malfunction of any device in the present system.

FIG. 10 shows an example of an operation performed by the present system implemented by using the Docker technology in order to cope with a malfunction of any of the devices (host machines) composing a cluster (such as a loss of the heartbeat of "Docker Swarm Manager"). By performing this operation, the virtual container having operated in the malfunctioning node can be restarted, an end option can be specified, or the malfunctioning node can be restarted on a different host machine, for example.

First, if there is only one agent that matches with the defined label for the virtual container having operated in the malfunctioning node (if Yes in S90), system recovery is impossible until the agent is recovered (S93). In that case, the virtual container may be stopped or discarded as shown in FIG. 7 (S76).

However, if the virtual container assigned to be disposed of has no record of previous interactions (that is, if the virtual container is stateless), system recovery is possible immediately after the agent is recovered. That is, system recovery is possible after a shorter downtime, if a design guideline is followed that a "part that depends on a restriction" is formed by a minimum unit required for operation, and the "part that depends on a restriction" and a "part that does not depend on the restriction" are loosely coupled for operation.

If there are two or more agents that match with the defined label for the virtual container having operated in the malfunctioning node (if No in S90), the virtual container can be immediately activated on another agent owing to "Docker Swarm" (S91), and the robot system is recovered (S92). Therefore, by allowing a process that can be performed anywhere, such as image processing or operation planning, to be performed on any agent, a process performed on a host machine can be automatically restarted on another host machine composing the same cluster even if the host machine goes down.

However, even though the system is apparently immediately recovered, when the virtual container has a record of previous interactions (that is, if the virtual container is stateful), the state of the virtual container may be reset. In that case, if the state is kept outside the virtual container, a system with no downtime can be provided.

Leaving of any device from the cluster due to malfunction can be detected by a function of the "RDB-APPS" installed in the device. For example, the "RDB-APPS" of the computer terminal device regularly monitors the communication module unit of the computer terminal device, thereby regularly checking whether or not the communication module unit is connected to an active wireless base station provision unit. If a predetermined length of time elapses after the communication with the wireless base station is lost (the communication is disconnected), the RDB-APPS stops the virtual container (robot application) activated via the RDB-APPS.

On the other hand, the "RDB-APPS" of the robot application management device regularly monitors the wireless base station provision unit of the robot application management device, thereby regularly checking whether or not each device in a list of the devices composing the cluster (a list of the devices wirelessly connected to the robot application management device) is effectively connected. The list is stored in the "RDB-APPS" and updated based on the result of the regular monitoring (if another device enters the cluster as in S91 in FIG. 10, the devices in the list are changed).

If a predetermined length of time elapses after the communication with a device is lost (the communication is disconnected), the "RDB-APPS" of the robot application management device performs the operation in FIG. 10. If there is no device that can be used instead of the disconnected device, the RDB-APPS stops the virtual container (robot application) according to the operation procedure registry managed by the group-executed logical container virtualization environment provision unit. After that, if the RDB-APPS detects that the number of the devices wirelessly connected to the robot application management device has increased (the disconnected device or a new device replacing the disconnected device is newly connected to the robot application management device) by the regular monitoring described above, and a predetermined length of time elapses after the detection, the RDB-APPS activates the virtual container (robot application) on the newly connected device according to the operation procedure registry.

Design guidelines for optimizing the use of a computer resource while meeting a requirement of a "system having a restriction", such as a robot system, can be summarized as follows.

A. A virtual container orchestration tool pools computer resources across host machines and manages placement of a virtual container.

B. A system having a restriction is divided into a "part that depends on the restriction" and a "part that does not depend on the restriction" (the term "restriction" means that the host machine that executes the virtual container is restricted).

C. The "part that depends on the restriction" is formed by a minimum unit required for operation.

D. The "part that depends on the restriction" and the "part that does not depend on the restriction" are loosely coupled for operation (using the ROS topic communication model, for example).

With a mechanism for realizing the design guidelines and a system implemented according to the guidelines, even if a part of the computer resource becomes unavailable, the part can be automatically replaced by another part of the computer resource, and even if a part of the system goes down, the influence on the other parts can be minimized, and a cascade of downs involving other systems can be prevented. In addition, even the part of the system having gone down can be automatically recovered if a condition is satisfied, and the influence of the restriction can be minimized.

Although the above description has been focused on the application of the present system to a field of network service robots that involves continuous development and operation, the present invention can also be applied to the field of IoT that involves handling a vast amount of video, audio, 3D or other data, the field of network infrastructures that involves multi-functional Wi-Fi access points, or the field of sharing economy of hardware equipment via cloud services and associated billing systems, for example.

In addition to the functions described above, the "RDB-APPS" installed in each host machine may have a function for partially introducing the virtual container technology to the system. This function allows a user who is unfamiliar with handling Docker to start the container-based virtualization with a small start, and if a hardware connection that cannot be recognized by Docker is required, a bare metal-mixed environment can be permitted.

Figure 11:
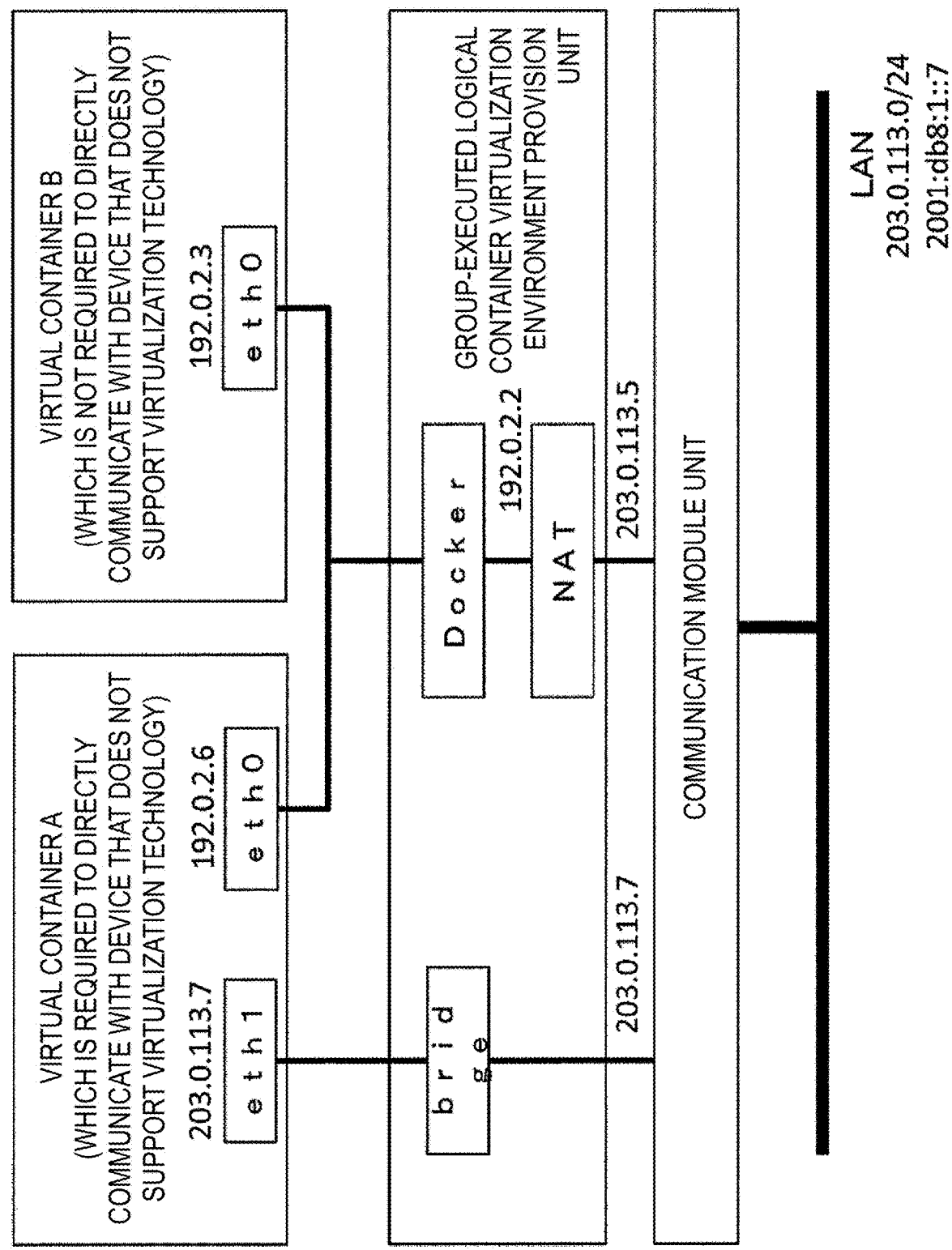
FIG. 11 is a diagram showing an example of a mechanism that builds a robot system in which a device that supports a virtual container technology and a device that does not support a virtual container technology are mixed in the present system.

FIG. 11 shows an example of a mechanism for constructing the present system implemented using the Docker technology in which devices that support the virtual container technology and devices that do not support the virtual container technology are mixed. When activating a virtual container B that has only to cooperate with other virtual containers, a private IP address (eth0: 199.0.2.3) for Docker is assigned to the virtual container B and then is converted into an IP address (203.0.113.5) for the host OS of the node in which the virtual container B is placed for communication via a local area network.

On the other hand, when activating a virtual container A that is required to cooperate with a device that does not support the virtual container technology, not only a private IP address (eth0: 192.0.2.6) for Docker but also an IP address (eth1: 203.0.113.7) yet to be assigned in the same LAN segment as the host OS of the node in which the virtual container A is placed is assigned to the virtual container A. The assigned IP address eth0 is converted into an IP address (203.0.113.5) of the host OS of the node in which the virtual container A is placed for communication via the LAN, whereas the assigned IP address eth1 is used without change for communication with the device that does not support the virtual container technology (computer device 500 in FIGS. 1 and 2) in the LAN segment.

To realize the mechanism described above, for example, the "RDB-APPS" includes an application for detecting an activation of a virtual container placed on the device (regardless of whether the virtual container is automatically activated by Swarm or manually activated by the user and whether the activated virtual container is placed in the device at the start of execution of the robot application or relocated from another device during execution of the robot application), and performs the process described below in response to the detection.

First, by referring to a flag assigned to the virtual container, whether the IP address in the same LAN segment as the host OS needs to be assigned to the virtual container (that is, whether the virtual container is required to cooperate with a device that does not support the virtual container technology) is determined.

If the IP address needs to be assigned, the RDB-APPS assigns a virtual interface (eth*) other than the virtual interface (eth0) for Docker to the activated virtual container, assigns a physical address (MAC address) generated by hashing a host name of the activated virtual container to the activated virtual container, requests a DHCP server or router to issue an IP address using the physical address and the host name of the virtual container, and assigns the issued IP address to the virtual interface (eth*). After assigning the IP address, the RDB-APPS may check the communication with the LAN or WAN.

Figure 12:
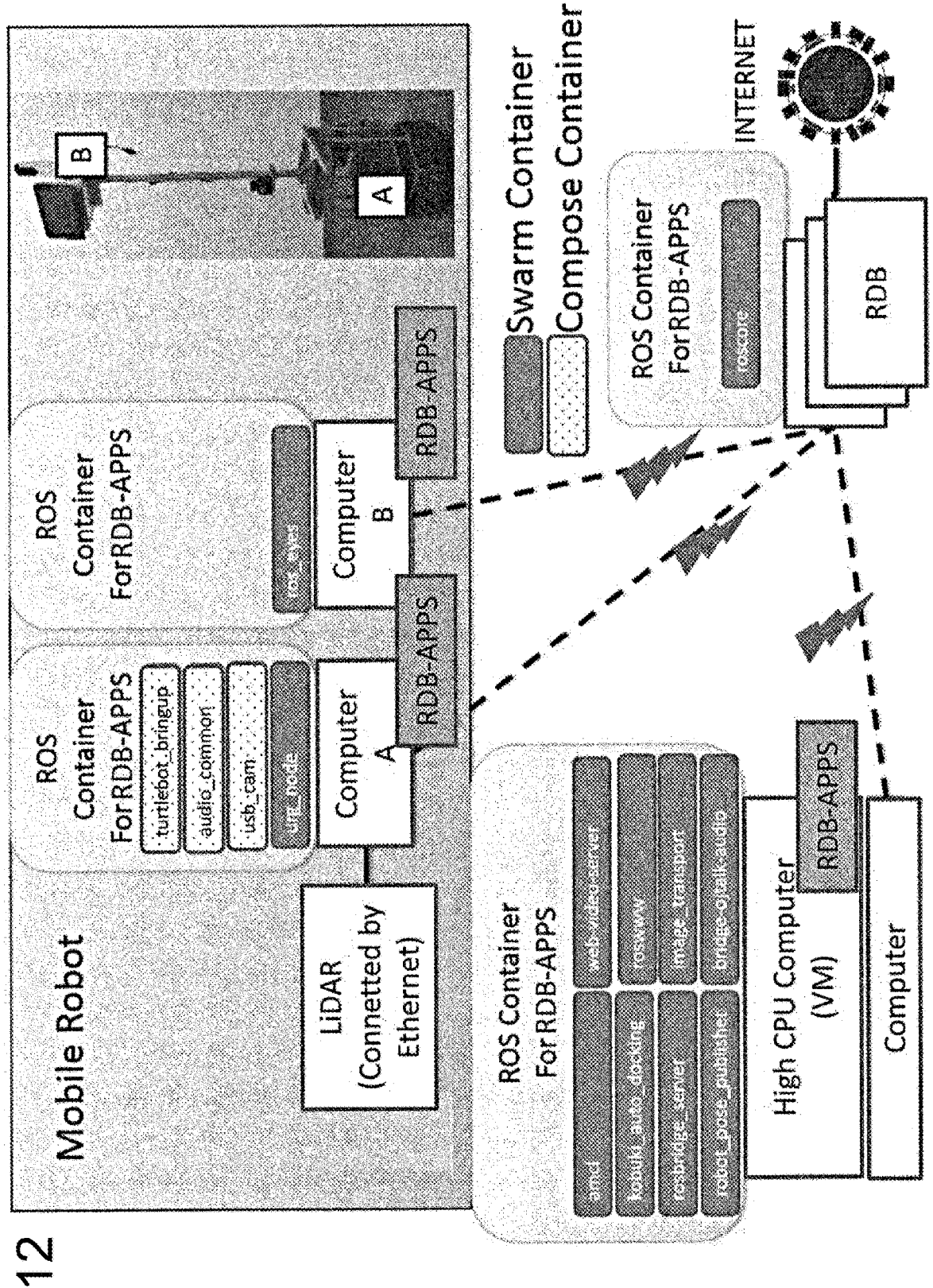
FIG. 12 is a diagram showing an example of placement of virtual containers in the present system.

FIG. 12 shows an example of the present system built using the Docker technology for an image inspection mobile robot including a plurality of cameras (the image inspection mobile robot is a robot that autonomously moves to anywhere to take a high-resolution image and performs analysis of the real world by image analysis, and is referred to as a "real robot" herein).

A distributed computation system in the example in FIG. 12 is formed by a robot application management device ("RDB") and other three computers. The other three computers are low power consumption computers "Computer_A" and "Computer_B" mounted on the real robot and a computer "High_CPU_Computer" that has a high-performance CPU and is specialized for computation. The computers are connected to each other by a Wi-Fi network provided by the RDB.

A daemon ("RDB-APPS") for separately operating a container for the robot is installed in each computer, and a Docker container ("ROS Container For RDB-APPS") operates on each computer. The Docker container is the standard ROS container integrated with a ROS application on a node basis. The set of the integrated Docker containers provides the robot service.

The computer "Computer_A" is connected to an USB camera, the mobile robot, and audio equipment, such as a speaker or a microphone. To control such a device having physical connections from a Docker container, the controlling virtual container is implemented using "Docker Compose" in the example in FIG. 12. Alternatively, the virtual container may be implemented using "Docker Swarm" and the function of choosing an executing node based on a label "docker-compose.yml" specified when the container is activated.

Virtual containers deployed on the computer "Computer_A" include a container "urg_node" for operation of a laser ranging device (connected by Ethernet (registered trademark)), a container "usb_cam" for operation of a plurality of cameras (connected by USB), a container "audio_common" for a speaker/microphone (connected by audio jack), and a driver container "turtlebot_bringup" for the mobile robot (connected by USB). The virtual container "urg_node" is a virtual container that can be placed and activated in another computer, while the virtual containers "usb_cam", "audio_common" and "turtlebot_bringup" are virtual containers that control a device having a physical connection and therefore have to be placed and activated in the computer "Computer_A".

Virtual containers deployed on the computer "Computer_B", which is another computer resource mounted on the real robot, include a container "ros_eye" for controlling a screen (connected by serial bus), for example.

Virtual containers deployed on the computer "High_CPU_Computer", which is a computer resource provided at a location separate from the real robot, include a container "amcl" for path finding computation for the mobile robot, a container "web_video_server" for converting a movie taken by the virtual container "usb_cam" on the computer "Computer_A" into HTML5, a container "kobuki_auto_docking" for computation of a path from the current location of the mobile robot to a charger, containers "roswww" and "ros_bridge_server" for handling the ROS in HTML5, a container "image_transport" for compressing an image from the virtual container "usb_cam" on the computer "Computer_A", a container "robot_pose_publisher" for computing and publishing the posture (quarternion) of the mobile robot, and a container "bridge_ojtalk_audio" for speech synthesis, for example.

In this example, from the viewpoint that the virtual container having a restriction from the physical connection is created to have no record of previous interactions (that is, to be stateless), videos, images or the like taken by the container "usb_cam" are stored in another container, such as "web_video_server" or "image_transport". Such other containers have no restriction from the physical connection and therefore are deployed on the computer "High_CPU_Computer", rather than on the computer "Computer_A".

Virtual containers deployed on the RDB, which itself is a computer resource, include a container "rescore" for address resolution of the nodes participating in the ROS. The capacity of the CPU, the memory, the disk or the like of the RDB can be increased or decreased depending on the service of the Docker container operating on the RDB. When the RDB is required to perform complicated computations, a higher performance computer or a computer including a higher performance GPU can be used.

The RDB may have a temperature sensor, an atmospheric pressure sensor and a humidity sensor. In that case, a Docker container for controlling the temperature sensor, a Docker container for controlling the atmospheric pressure sensor and a Docker container for controlling the humidity sensor are virtual containers that control a device having a physical connection, so that the Docker containers need to be placed and activated on the RDB, and therefore deployed on the RDB.

Although an embodiment of the present invention has been described above, those skilled in the art can modify, improve or apply the embodiment described above in various ways, and such modifications, improvements and applications are within the scope of the present invention, of course.

The invention claimed is:

1. A robot application management device that executes a robot application by executing a plurality of kinds of virtual containers in cooperation with each other, comprising:
   means for managing a group of devices including at least one robot device and at least one computer device that are connected to the robot application management device via a local area network as a cluster for executing the robot application; and
   means for placing and activating each of the plurality of kinds of virtual containers in any of the group of devices composing the cluster,
   wherein the plurality of kinds of virtual containers include a first kind of virtual container that is capable of choosing any device as a device for executing the virtual container, and a second kind of virtual container that involves a physical connection in the robot device and therefore has a restriction on the choice of a device for executing the virtual container,
   the first kind of virtual container and the second kind of virtual container are loosely coupled for operation,
   placement of the second kind of virtual container is achieved by choosing a device that meets the restriction,
   the virtual container that has a restriction on the choice of a device for executing the virtual container is stateless, and
   when malfunction of any of the group of devices composing the cluster occurs, and execution of the robot application is stopped, if the malfunctioning device or a device that replaces the malfunctioning device is recovered as a device composing the cluster, execution of the robot application is restarted by placing and activating the virtual container in the recovered device.

2. The robot application management device according to claim 1, wherein the group of devices composing the cluster includes at least one cloud service device connected to the robot application management device via an external network.

3. The robot application management device according to claim 1, wherein the plurality of kinds of virtual containers include a third kind of virtual container that requires a predetermined or higher processing or storage capacity and therefore has another restriction on the choice of a device for executing the virtual container, the third kind of virtual container and the first and second kinds of virtual containers are loosely coupled for operation, and placement of the third kind of virtual container is achieved by choosing a device that meets the another restriction.

4. The robot application management device according to claim 1, further comprising means for storing a procedure for placing and activating each of the plurality of kinds of virtual containers in any of the group of devices composing the cluster.

5. The robot application management device according to claim 1, further comprising means for storing information about which restriction each of the group of devices composing the cluster meets.

6. The robot application management device according to claim 1, further comprising means for storing an executable program for virtual container, and the device in which each of the plurality of kinds of virtual containers is placed is capable of obtaining the executable program for the virtual container.

7. The robot application management device according to claim 1, wherein the executable program for the virtual container is a package of an application program and an operating system (OS) that form the robot application, a separate space for each virtual container is formed on a host OS of each device, and the executable program is executed in such a manner that the executable program appears to the host OS as if the executable program is a process.

8. The robot application management device according to claim 1, further comprising means for keeping the robot application being executed when malfunction of any of the group of devices composing the cluster occurs, by relocating the virtual container operating on the malfunctioning device to another device composing the cluster and activating the virtual container on the another device, wherein relocation of the virtual container that has any restriction on the choice of a device for executing the virtual container is achieved by choosing a device that meets the restriction, and execution of the robot application is stopped if there is no device that meets the restriction other than the malfunctioning device.

9. The robot application management device according to claim 1, further comprising:

means for stopping the virtual container when the device in which the virtual container is activated leaves the cluster; and means for storing a procedure for stopping the virtual container.

10. The robot application management device according to claim 1, further comprising means for collecting information about a state of each of the plurality of kinds of virtual containers including in which device the virtual container is placed and whether the virtual container is operating or not, and transmitting the information to at least one of a service that presents the information to a user or a service that stores a history of the information.

11. The robot application management device according to claim 1, further comprising means for assisting a network connection to enable the virtual containers in the devices composing the cluster to communicate with each other via the local area network, wherein the robot application management device is provided with at least a part of the means as a result of one of the plurality of kinds of virtual containers being placed and activated in the robot application management device.

12. The robot application management device according to claim 1, wherein the at least one robot device includes a mobile robot, at least a connection of the local area network to the mobile robot is a wireless connection, and the robot application management device has at least one of an access point function and a multi-hop function for the wireless connection.

13. The robot application management device according to claim 1, wherein the group of devices composing the cluster includes at least one secondary robot application management device that includes at least some of the means provided in the robot application management device.

14. The robot application management device according to claim 1, wherein the robot application management device is located at a boundary between the local area network and an external network, and the robot application management device further comprises means for protecting each device connected to the local area network from the external network.

15. The robot application management device according to claim 1, further comprising a sensor that provides data on a physical environment for the robot application, wherein a virtual container that controls the sensor is placed as one of the plurality of kinds of virtual containers and activated in the robot application management device.

16. The robot application management device according to claim 1, further comprising means for assigning an address for network connection to enable at least one virtual container in at least one of the devices composing the cluster to communicate with a device that does not form the cluster via the local network.

17. A system comprising:

a robot application management device that executes a robot application by executing a plurality of kinds of virtual containers in cooperation with each other; and at least one robot device and at least one computer device that are connected to the robot application management device via a local area network, wherein the system further comprises:

means for managing the group of devices in the system as a cluster for executing the robot application; and means for placing and activating each of the plurality of kinds of virtual containers in any of the group of devices composing the cluster, the plurality of kinds of virtual containers include a first kind of virtual container that is capable of choosing any device as a device for executing the virtual container, and a second kind of virtual container that involves a physical connection in the robot device and therefore has a restriction on the choice of a device for executing the virtual container, the first kind of virtual container and the second kind of virtual container are loosely coupled for operation, placement of the second kind of virtual container is achieved by choosing a device that meets the restriction, the virtual container that has a restriction on the choice of a device for executing the virtual container is stateless, and when malfunction of any of the group of devices composing the cluster occurs, and execution of the robot application is stopped, if the malfunctioning device or a device that replaces the malfunctioning device is recovered as a device composing the cluster, execution of the robot application is restarted by placing and activating the virtual container in the recovered device.

18. A robot application management method for executing a robot application by executing a plurality of kinds of virtual containers in cooperation with each other, wherein a group of devices including at least one robot device and at least one computer device that are connected to a device that performs the robot application management method via a local area network are managed as a cluster for executing the robot application, and the plurality of kinds of virtual containers include a first kind of virtual container that is capable of choosing any device as a device for executing the virtual container, and a second kind of virtual container that involves a physical connection in the robot device and therefore has a restriction on the choice of a device for executing the virtual container, the first kind of virtual container and the second kind of virtual container are loosely coupled for operation, each of the plurality of kinds of virtual containers is placed and activated in any of the group of devices composing the cluster, placement of the second kind of virtual container is achieved by choosing a device that meets the restriction, the virtual container that has a restriction on the choice of a device for executing the virtual container is stateless, and when malfunction of any of the group of devices composing the cluster occurs, and execution of the robot application is stopped, if the malfunctioning device or a device that replaces the malfunctioning device is recovered as a device composing the cluster, execution of the robot application is restarted by placing and activating the virtual container in the recovered device.

19. A robot application management program that executes a robot application by executing a plurality of kinds of virtual containers in cooperation with each other, comprising:

a program code for managing a group of devices including at least one robot device and at least one computer device that are connected to a device in which the robot application management program is installed via a local area network as a cluster for executing the robot application; and a program code for placing and activating each of the plurality of kinds of virtual containers in any of the group of devices composing the cluster, wherein the plurality of kinds of virtual containers include a first kind of virtual container that is capable of choosing any device as a device for executing the virtual container, and a second kind of virtual container that involves a physical connection in the robot device and therefore has a restriction on the choice of a device for executing the virtual container, the first kind of virtual container and the second kind of virtual container are loosely coupled for operation, placement of the second kind of virtual container is achieved by choosing a device that meets the restriction, the virtual container that has a restriction on the choice of a device for executing the virtual container is stateless, and when malfunction of any of the group of devices composing the cluster occurs, and execution of the robot application is stopped, if the malfunctioning device or a device that replaces the malfunctioning device is recovered as a device composing the cluster, execution of the robot application is restarted by placing and activating the virtual container in the recovered device.

* * * * *